G. JACOBS.
PNEUMATIC TIRE.
APPLICATION FILED MAR. 13, 1908.

921,710.

Patented May 18, 1909.

Witnesses
Fred. C. Caswell
F. C. Dahlberg.

Inventor
Grant Jacobs.
by Orwig & Lane Att'ys

UNITED STATES PATENT OFFICE.

GRANT JACOBS, OF DES MOINES, IOWA.

PNEUMATIC TIRE.

No. 921,710.

Specification of Letters Patent.

Patented May 18, 1909.

Application filed March 13, 1908. Serial No. 420,941.

*To all whom it may concern:*

Be it known that I, GRANT JACOBS, a citizen of the United States, residing at Des Moines, in the county of Polk and State of Iowa, have invented a new and useful Pneumatic Tire, of which the following is a specification.

The object of my invention is to provide a pneumatic tire of simple, durable and inexpensive construction, in which the tread portion of the outer casing is detachably connected with the sides of the outer casing, so that when the tread portion becomes worn, a new tread portion may be substituted for the worn one, thus effecting a great economy in the use of pneumatic tires.

A further object is to provide a tire of this kind, with means whereby wear upon the side members is eliminated to thereby lengthen the life of said side members.

A further object is to provide a pneumatic tire of this kind, in which the tires are prevented from skidding.

My invention consists in the construction, arrangement and combination of the various parts of the device, whereby the objects contemplated are attained, as hereinafter more fully set forth, pointed out in my claim and illustrated in the accompanying drawings, in which—

Figure 1:
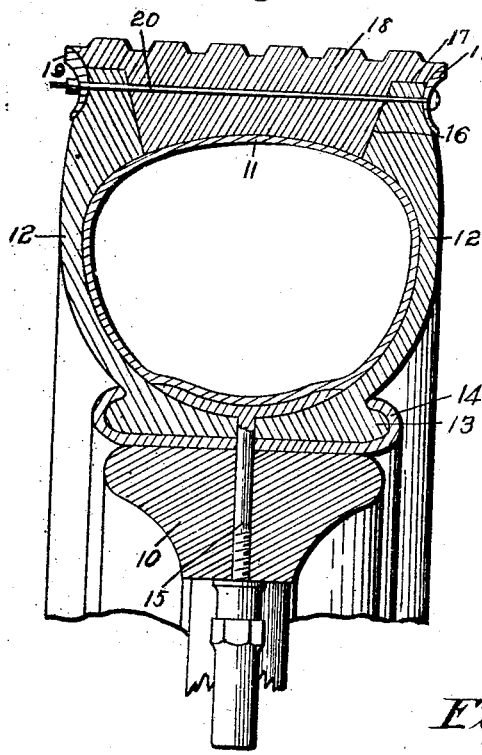
Figure 2:
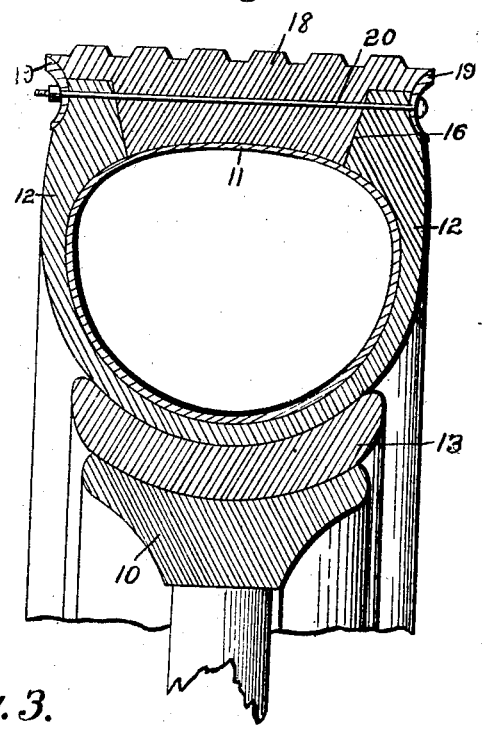
Figure 3:
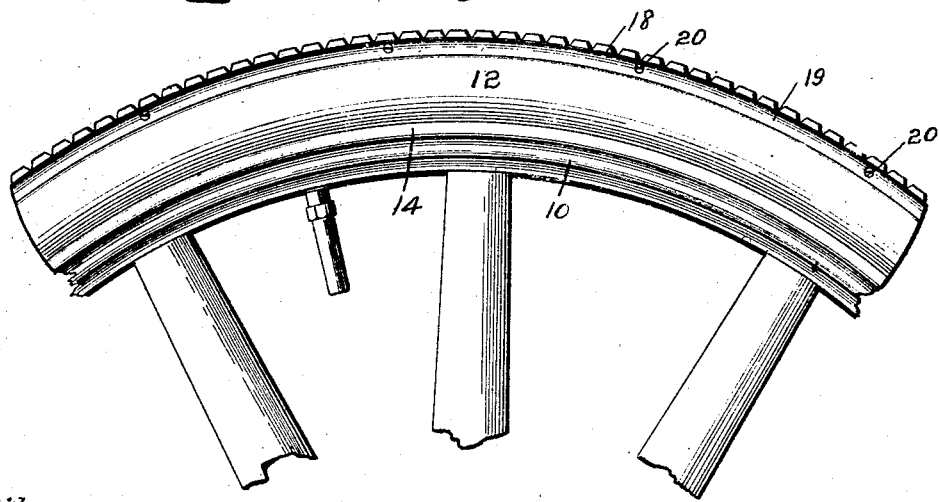

Figure 1 shows a transverse sectional view through a tire embodying my invention, and connected to a vehicle rim. Fig. 2 shows a similar view of a slightly modified form, and—Fig. 3 shows a side elevation of a portion of a tire embodying my invention, and connected to a vehicle rim.

Referring to the accompanying drawings, I have used the reference numeral 10 to indicate that portion of the vehicle rim shown, and 11 to indicate the inner tube of the pneumatic tire. In Fig. 1 of the drawings, the outer casing of the tire is shown to be formed of three members, comprising two sides, and a tread portion. The sides are indicated by the reference numeral 12, and are detachably connected with the rim by having an annular rib 13 formed thereon, to enter an annular groove formed in the rim member 14. This means for connecting pneumatic tires to rims does not form part of my present invention. The side members are further connected to the rim by means of the headed bolts, such as are indicated by the numeral 15 in Fig. 1. The edges of said side portions 12 that are adjacent to the tread portion, are beveled or inclined at 16, and provided with a shoulder 17.

The tread portion of the tire comprises a body member 18, preferably of resilient material such as rubber. This tread portion is substantially flat on its outer surface, and is preferably provided with integral lugs to form a rough surface tread. The side edges of the tread portion are shaped to fit against the shoulders 17 and the beveled edges 16 of the side members, as clearly shown in Fig. 1.

I provide for connecting the tread portion with the side portions by means of two metal rims 19 extended around the sides of the tire adjacent to the periphery of the tread portion. These metal rims serve the double function of providing means to receive the rods 20 which pass through the metal rims, through the sides 12, and through the tread portion 18. Said metal rims also serve to protect the sides 12 from wear. In this connection, it is to be understood that on smooth and level roads, all of the wear upon the pneumatic tire is upon the tread portion, and wear is thrown upon the side portions only when the tire is traveling through ruts or grooves which are slightly narrower than the tire, then considerable wear is thrown upon the side portions, and with the ordinary style of round tire; the wear thus occasioned quickly destroys the side portions. By the use of the metal rims 19, the sides of a rut or groove in a road surface will be cut away to the same width as the body of the tire, so that the sides of the tire will not rub against the sides of said rut or groove. Furthermore, the flat tread portion of the tire, assisted by the metal rims 19, will tend to prevent skidding of the tires, because said metal rims will cut into a smooth, wet, or slippery road surface sufficiently to prevent lateral movement of the tire on the road way.

In the modified form shown in Fig. 2, the two side portions 12 are united, and connected to the rim by cement, or in any ordinary way. The novel features of my invention in the form shown in Fig. 2 are exactly the same as in the form shown in Fig. 1.

In practical use, and assuming that the tire is being used on comparatively smooth, level roads, then obviously, all of the wear upon the tire is thrown upon the tread portion. When the tread portion becomes worn out, the operator need only remove the bolts 20 and then remove the worn tread, portion after which a new tread portion may be substituted for the worn one, whereupon the tire will be again ready for use. This may be done at much less expense than the substitution of a new outer casing, or if the side members of the tire should become cut, or in any way injured, the tread portion could be removed and used in connection with new sides. Furthermore, the metal rims at the edges of the tire serve the double function of preventing skidding, and of cutting out the sides of ruts or grooves in a road-way, to prevent wear upon the side portions of the tire.

I claim as my invention:

A pneumatic tire, comprising an inner tube, an outer tube having two sides with their outer edges spaced apart and formed with shoulders at the periphery thereof, a tread member having a substantially flat face and being designed to fit between the edges of the said sides and to rest against the outer portions of said shoulders, the said flat tread portion being of substantially the same width as the greatest width of the tire at the central portion of the sides, and two metal rims arranged in position overlapping the side edges of the tire and the tread portion at the point where they engage each other and also being provided with sharpened outer edges substantially as and for the purposes stated.

Des Moines, Iowa, March 3, 1908.

GRANT JACOBS.

Witnesses:
RALPH ORWIG,
S. F. CHRISTY.